3,354,209
POLY(DIHYDROXYALKYL) TERTIARY AMINES
Karl Brack, Wilmington, Del., assignor to Hercules
Incorporated, a corporation of Delaware
No Drawing. Filed Feb. 19, 1964, Ser. No. 345,856
8 Claims. (Cl. 260—563)

ABSTRACT OF THE DISCLOSURE

Poly(dihydroxyalkyl) tertiary amines such as tris(dihydroxyoctadecyl) amine, hydroxyethyl-, phenyl-, or cyclohexyl - bis(dihydroxyoctadecyl) amine, tris(dihydroxyundecyl) amine and tetra(dihydroxyoctadecyl) tolylene or hexylene diamine, which are useful in the preparation of films, coatings, adhesives and urethane foams, are described. These amines are produced by reacting on epoxy alcohol containing at least 7 carbon atoms with ammonia or a primary amine using at least one mole of the alcohol for each hydrogen attached to the nitrogen in the ammonia or primary amine.

---

This invention relates to nitrogen-containing polyols and, more particularly, to poly(dihydroxyalkyl) tertiary amines prepared by the reaction of an epoxy alcohol with ammonia or a primary amine and to their use in the preparation of films and urethane foams.

In accordance with this invention, it has been found that new poly(dihydroxyalkyl) tertiary amines are produced when an epoxy alcohol is reacted with ammonia or a primary amine in the proportion of at least one mole of epoxy alcohol for each hydrogen attached to the nitrogen in the ammonia or primary amine, the reaction taking place between the epoxy group of the epoxy alcohol and each of the hydrogens attached to the nitrogen of the ammonia or primary amine, to produce a poly(dihydroxyalkyl) tertiary amine. The reaction which takes place may be set forth as

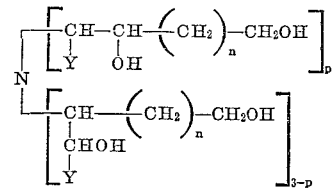

or

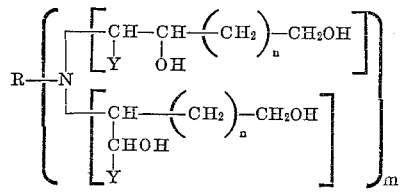

where $n$ is a whole number greater than 3, $m$ is a whole number from 1 to 2, Y is hydrogen or an alkyl radical having 1 to 8 carbon atoms, R is an alkyl, hydroxyalkyl, cycloalkyl, aryl, alkaryl, or aralkyl radical when $m$ is equal to 1 and an alkylene, arylene, alkarylene, or aralkylene radical when $m$ is equal to 2. Since either of the epoxy oxygen to carbon bonds can react, there can also be produced the isomeric amines.

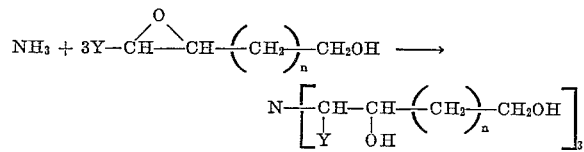

or

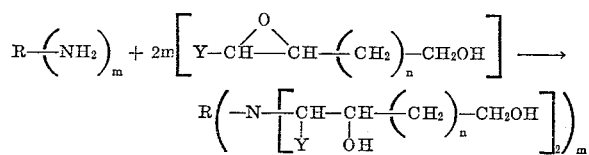

as well as the mixed amines having the formula

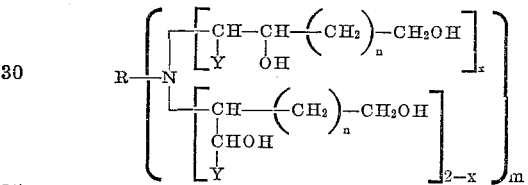

or

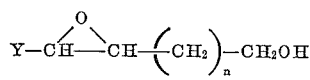

where $p$ is 1 or 2 and R, Y, $m$, and $n$ are as above stated. However, due to steric effects or other causes it is possible that only one product may be formed, or if two products are formed, they may not be formed in equal amounts. The formulae shown are only intended to illustrate the types of ring opening reaction which may take place. Thus, the new poly(dihydroxyalkyl) tertiary amines of this invention may be said to have the general formula

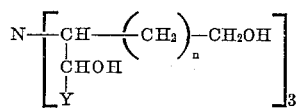

where $n$ is a whole number greater than 3, $x$ is a whole number from 0 to 2, $m$ is a whole number from 1 to 2, Y is hydrogen or an alkyl radical having 1 to 8 carbon atoms, and R is an alkyl, hydroxyalkyl, cycloalkyl, aryl, alkaryl, aralkyl,

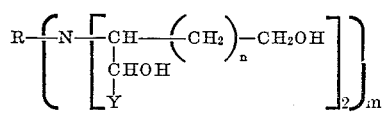

radical when $n$, $x$, and Y are as above and $m$ is equal to 1 and R is an alkylene, arylene, alkarylene, or aralkylene radical when $n$, $x$, and Y are as above and $m$ is equal to 2.

The new poly(dihydroxyalkyl) tertiary amines of this invention are valuable new products which are useful in the preparation of films, coatings, and urethane foams.

Any epoxy alcohol containing at least 7 carbon atoms may be used to prepare the new poly(dihydroxyalkyl) tertiary amines useful in the production of films, coatings, adhesives, and urethane foams. Thus, the epoxy alcohols reacted with ammonia or with a primary amine in accordance with this invention will have the general formula $$Y-\overset{O}{\overset{\diagup\diagdown}{CH}}-CH-(CH_2)_n-CH_2OH$$

where $n$ is a whole number greater than 3, and preferably from 4 to 9, and Y is hydrogen or an alkyl radical. Exemplary of these epoxy alcohols are 9,10-epoxydecanol, 10,11-epoxyundecanol, 4,5-epoxytetradecanol, 8,9-epoxyhexadecanol, 9,10-epoxyoctadecanol, and the like.

The amines useful in the present invention are ammonia or primary mono- or diamines of the formula $R(NH_2)_m$, where $m$ is a whole number from 1 to 2 and R is an alkyl, hydroxyalkyl, cycloalkyl, aryl, alkaryl or aralkyl radical when $m$ is equal to 1 and an alkyene, arylene, alkarylene or aralkylene radical when $m$ is equal to 2. Preferred amines include ammonia, ethanolamine, aniline, cyclohexylamine, ethylenediamine, toluenediamine, o-, m-, or p-phenylenediamine, methylamine, ethylamine, 1,6-diaminohexane, phenylethylamine, fatty amines such as octadecylamine and the like.

The reaction between the epoxy alcohol and ammonia or primary amine to produce the new poly(dihydroxyalkyl) tertiary amines of this invention is readily carried out by mixing the two reagents in the proportion such that there is at least one mole of epoxy alcohol present for each hydrogen attached to nitrogen in the ammonia or primary amine and heating the mixture to a temperature of from about 100° C. to about 250° C., and preferably from about 150° to about 200° C., until the reaction is complete. An inert diluent may be used in carrying out the reaction, if desired, but is generally not necessary. Suitable diluents that can be used are benzene, toluene, dioxane, dimethylsulfoxide, dimethylformamide, methanol, ethanol, and the like. The inert diluent, if employed, need not be anhydrous. Traces of water in the reaction mixture are not harmful and have even been found in some cases to have a beneficial effect on the epoxide-amine reaction. While catalysts are not necessary to bring about the reaction, it is frequently desirable to add a catalyst in order to speed up the reaction, particularly when primary amines are being reacted with internal epoxides. Exemplary of the catalysts that may be used are the strong bases such as benzyltrimethylammonium hydroxide, sodium hydroxide, sodium methoxide, potassium t-butoxide, and the like.

The following examples will illustrate the preparation of the new poly(dihydroxyalkyl) tertiary amines of this invention and their use in the preparation of films and polyurethane foams. All parts and percentages are by weight unless otherwise indicated.

*Example 1*

Fifteen hundred (1500) parts of 9,10-epoxyoctadecanol (4.2% oxirane oxygen; 74% pure) and 22.5 parts of anhydrous ammonia were mixed and heated at 200° C. for 24 hours in an autoclave. The reaction product was dissolved in 2375 parts of methanol and the methanol solution stirred with 5000 parts of a sulfonic acid type ion exchange resin at room temperature for 2 hours. The liquid phase was drained from the resin and the resin washed three times using 2375 parts of methanol for each wash. The liquid phase and the methanol washes were combined and distilled, 653 parts of unreacted 9,10-epoxyoctadecanol being recovered. Next, 3960 parts of methanol were added to the ion exchange resin and sufficient (about 50 parts) ammonia was introduced to displace the product on the ion exchange resin. Again the liquid phase was drained from the resin and the resin washed three times using 2375 parts of methanol for each wash. The liquid phase and the methanol washes were combined and distilled, whereby there was obtained 815 parts of tris(dihydroxyoctadecyl) amine as an amber oil which on analysis contained 2.3% nitrogen (total); 2.1% tertiary amine; and 11.4% active hydrogen (as hydroxyl).

Twenty (20) parts of the above tris(dihydroxyoctadecyl) amine, 20.5 parts of toluene diisocyanate, and 0.1 part of a silicone oil surfactant were mixed and stirred vigorously for 20 seconds. Next, 0.6 part of distilled water containing 0.1 part of triethylenediamine catalyst was added to the mixture at once and the stirring continued for an additional 5 seconds. The reaction mixture was poured into an aluminum dish, allowed to foam up at room temperature, and then cured overnight at room temperature. A fine cellular, regular foam which was hard, but not brittle, and insoluble in methanol, methylisobutylketone and tetrahydrofuran was obtained, the foam having a density of 4.4 lbs. per cubic foot.

One part of the above tris(dihydroxyoctadecyl) amine was dissolved in 10 parts of tetrahydrofuran and 0.57 part of toluene diisocyanate was added. The solution was mixed well and a film was cast on a glass plate. After curing the film at room temperature overnight, a glass-clear film was obtained, the film having a Sward hardness of 40 and exhibiting insolubility in solvents such as alcohol, ether, tetrahydrofuran, and methylisobutylketone.

*Example 2*

Twenty (20) parts of 9,10-epoxyoctadecanol (5.6% oxirane oxygen), 0.06 part of sodium hydroxide, and 1.5 parts ethanolamine were heated in a Carius tube at 200° C. for 24 hours. The crude hydroxyethyl bis(dihydroxyoctadecyl) amine analyzed: 1.8% total amine; 1.7% tertiary amine; no measurable amount of secondary amine; and 0.1% primary amine.

*Example 3*

The procedure of Example 2 was repeated except that 2.0 parts of aniline were used in place of the ethanolamine. Analysis of the crude phenyl bis(dihydroxyoctadecyl) amine showed 1.33% nitrogen and 1.28% tertiary amine.

*Example 4*

The procedure of Example 2 was repeated using 35 parts of 9,10-epoxyoctadecanol (5.25% oxirane oxygen), 3.5 parts of cyclohexylamine, and 0.1 part powdered sodium hydroxide, and the mixture heated to 210° C. for 60 hours. The crude cyclohexyl bis(dihydroxyoctadecyl) amine analyzed: 0.8% total amine; 0.8% tertiary amine; and no secondary or primary amine.

Twenty (20) parts of the above crude cyclohexyl bis(dihydroxyoctadecyl) amine was dissolved in 104 parts hot toluene and stirred with 100 parts of a sulfonic acid type ion exchange resin for 2 hours at 80–90° C. The solution was decanted from the resin and the resin washed three times using 87 parts toluene for each wash. After the toluene extracts were combined and distilled, 10.1 parts of unreacted 9,10-epoxyoctadecanol was recovered.

The ion exchange resin was then treated with 20 parts potassium hydroxide dissolved in 237 parts methanol. After 1 hour, the methanol solution was decanted from the resin and the resin washed three times using 80 parts of methanol for each wash. The methanol extracts were combined and distilled and the residue therefrom was treated with 50 parts of distilled water and 173 parts toluene. After shaking, the toluene layer was separated from the aqueous layer and then dried over sodium sulfate. After removal of the toluene by distillation, 8.5 parts of an amber oil was obtained as the residue. The cyclohexyl bis(dihydroxyoctadecyl) amine so obtained on analysis was found to contain 2.6% tertiary amine and 9.7% active hydrogen (calculated as hydroxyl and corrected for water).

*Example 5*

Twenty (20) parts of 10,11-epoxyundecanol (8.0% oxirane oxygen; 93% pure) and 0.85 part of anhydrous ammonia were reacted in the manner of Example 1 except that the mixture was heated slowly to 200° C., maintained at 200° C. for 24 hours, and then cooled to room temperature. The crude reaction product was then dissolved in 238 parts methanol and the methanol solution stirred with 250 parts of the ion exchange resin at room temperature for 3 hours. The methanol solution was next decanted from the resin, and the resin washed three times with methanol using 238 parts methanol for each wash. Three hundred ninety-six (396) parts methanol was then added to the ion exchange resin and anhydrous ammonia introduced to displace the product on the resin. The methanol solution was decanted, the resin washed three times with 238 parts methanol, and the combined methanol solutions distilled. The tris(dihydroxyundecyl) amine so obtained amounted to 24.7 parts and was a clear oil which analyzed 2.4% total nitrogen; 2.3% tertiary amine; and 17.1% active hydrogen (as hydroxyl).

Example 6

One hundred sixty (160) parts 9,10-epoxyoctadecanol (5.25% oxirane oxygen; 93% pure) and 12.2 parts toluene diamine were reacted in the manner of Example 1 except that the heating was carried out under nitrogen with vigorous stirring. The crude reaction product was then dissolved in 2000 parts methanol and the methanol solution stirred with 1000 parts of the ion exchange resin. The methanol solution was next decanted from the resin, and the resin washed three times with methanol using 1500 parts methanol for each wash. One thousand (1000) parts of benzene and 100 parts sodium hydroxide dissolved in 500 parts distilled water were stirred with the ion exchange resin for 1 hour and the liquid drained from the resin. The benzene solution was separated from the aqueous solution, was washed three times with 300 parts of distilled water, was dried over 50 parts sodium sulfate, and then was distilled under reduced pressure to remove the benzene. The oily residue of tetra(dihydroxyoctadecyl) toluene diamine amounted to 122.1 parts and analyzed 2.3% total nitrogen; 2.1% tertiary amine; and 10.4% active hydrogen (as hydroxyl). A fine cellular, regular, hard and tough foam which was insoluble in methylisobutylketone, tetrahydrofuran and benzene was obtained when 20 parts of the above tetra(dihydroxyoctadecyl) toluene diamine was reacted with toluene diisocyanate in accordance with the procedure of Example 1.

Example 7

The procedure of Example 6 was repeated except that 140 parts of the 9,10-epoxyoctadecanol (5.25% oxirane oxygen; 93% pure) were heated with 11.6 parts of 1,6-diaminohexane instead of the toluene diamine. The oily residue of tetra(dihydroxyoctadecyl) hexylene diamine amounted to 117.5 parts and analyzed 2.2% total nitrogen; 2.0% tertiary nitrogen; and 9.8% active hydrogen (as hydroxyl). The above tetra(dihydroxyoctadecyl) hexylene diamine gave with toluene diisocyanate, after curing, a regular fine cellular, hard, but somewhat brittle, foam which had a density of 3.5 lbs./cu. ft., and was insoluble in benzene, methanol, methylisobutylketone, and tetrahydrofuran.

What I claim and desire to protect by Letters Patent is:

1. A poly(dihydroxyalkyl) tertiary amine having the formula

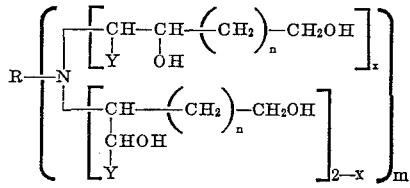

where $n$ is a whole number from 4 to 9, $x$ is a whole number from 0 to 2, $m$ is a whole number from 1 to 2, Y is selected from the group consisting of hydrogen and alkyl radicals having 1 to 8 carbon atoms, and R is a radical selected from the group consisting of alkyl, hydroxyalkyl, cyclohexyl, phenyl, phenalkyl,

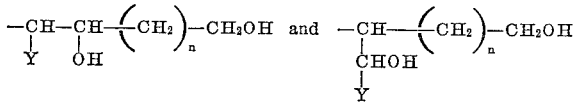

radicals when $n$, $x$, and Y are as above stated and $m$ is 1, and a radical selected from the group consisting of alkylene, phenylene and alkphenylene radicals when $n$, $x$, and Y are as above stated and $m$ is 2.

2. Tris(dihydroxyoctadecyl) amine having the formula of claim 1 wherein R is

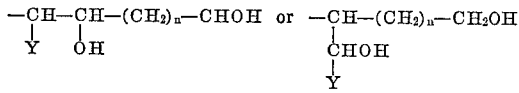

$m$ is 1 and, in each instance, Y is octyl and $n$ is 7.

3. Hydroxyethyl bis(dihydroxyoctadecyl) amine having the formula of claim 1 wherein Y is octyl, $n$ is 7, $m$ is 1 and R is hydroxyethyl.

4. Phenyl bis(dihydroxyoctadecyl) amine having the formula of claim 1 wherein Y is octyl, $n$ is 7, $m$ is 1 and R is phenyl.

5. Cyclohexyl bis(dihydroxyoctadecyl) amine having the formula of claim 1 wherein Y is octyl, $n$ is 7, $m$ is 1 and R is cyclohexyl.

6. Tris(dihydroxyundecyl) amine having the formula of claim 1 wherein R is

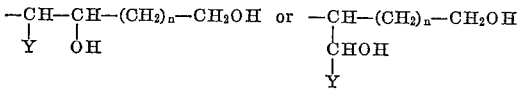

$m$ is 1 and, in each instance, Y is hydrogen and $n$ is 8.

7. Tetra(dihydroxyoctadecyl) toluene diamine having the formula of claim 1 wherein Y is octyl, $n$ is 7, $m$ is 2 and R is tolylene.

8. Tetra(dihydroxyoctadecyl) hexylene diamine having the formula of claim 1 wherein Y is octyl, $n$ is 7, $m$ is 2 and R is hexylene.

References Cited
UNITED STATES PATENTS
1,970,578   8/1934   Schoeller et al. _____ 260—563
2,161,322   6/1939   Steindorff et al. _____ 260—563

OTHER REFERENCES
German printed application U 2,188, January 1956, Wilkes et al.

CHARLES B. PARKER, *Primary Examiner.*

N. WICZER, P. C. IVES, *Assistant Examiners.*